United States Patent [19]

Kotyuk, Jr.

[11] Patent Number: 4,469,379
[45] Date of Patent: Sep. 4, 1984

[54] FLEXIBLE BELT WITH TREAD TO AID TURNING

[76] Inventor: Bernard Kotyuk, Jr., 265 E. 66th St., New York, N.Y. 10021

[21] Appl. No.: 464,847

[22] Filed: Feb. 8, 1983

[51] Int. Cl.³ .................. B62D 55/24; B62D 55/26
[52] U.S. Cl. .................. 305/35 EB; 305/54; 305/57
[58] Field of Search ............. 305/35 R, 35 EB, 54, 305/57; 301/43, 44 R, 44 T, 44 A, 44 B

[56] References Cited

U.S. PATENT DOCUMENTS

| | | | |
|---|---|---|---|
| 1,165,403 | 12/1915 | Hackney et al. | 301/44 R |
| 1,315,299 | 9/1919 | Gregory | 305/35 R |
| 1,814,046 | 7/1931 | Kegresse | 305/35 EB |
| 2,039,521 | 5/1936 | Cunnington | 301/44 A |
| 2,085,980 | 7/1937 | Hutchens | 301/44 A |
| 2,599,233 | 6/1952 | Christie | 305/57 X |

FOREIGN PATENT DOCUMENTS 976768  3/1951  France .............. 301/44 A

Primary Examiner—David A. Scherbel
Attorney, Agent, or Firm—Wolder, Gross & Yavner

[57] ABSTRACT

A tread for a tracked vehicle comprises a continuous, flexible base member formed into a track loop having inside and outside surfaces. A plurality of tread elements project outwardly from the base member, with each of said tread elements having the form of a truncated rectangular pyramid. A plurality of triangular gear teeth are mounted upon the inside surface of said base member in registry with said tread elements. The base member may comprise an inner core of steel mesh covered with a rubber coating.

7 Claims, 5 Drawing Figures

FLEXIBLE BELT WITH TREAD TO AID TURNING

The present invention relates to land vehicles and in particular to a tread for land vehicle such as a wheelchair, which may be provided with a track in the form of a continuous loop.

Conventional land vehicles designed for precise manipulation, such as a wheelchair, are normally provided with a pair of oppositely disposed wheels or tires, each one of which may be operated independently to provide the relatively small turning radius required by devices of that type. The wheels on such devices, however, are ordinarily rather large, and are not ordinarily well suited to be motor driven. It is therefore a purpose of the present invention to provide a new type of tread which may be utilized in a tracked version of such land vehicles, including wheelchairs, which exhibits improved performance over conventional wheel designs and tread structures for such vehicles.

Another purpose of the present invention is to provide a tread which demonstrates improved traction combined with a lessened turning radius.

Yet a further purpose of the present invention is to provide a tread having improved running characteristics, including lowered resistance, than conventional treads.

In furtherance of the above and other purposes, the present invention comprises a tread having a plurality of tapered tread elements projecting outwardly from a flexible base. The tapered design of the individual tread elements provides a reduced surface area for contact with the ground, while laterally provided means on the tread elements improve the lateral flexibility of the elements to minimize the required turning radius. In addition, a series of gear teeth are mounted seratim along the tread in opposed alignment to the individual tread elements to provide a continuous mating surface for the drive gear members of the vehicle.

The above brief description, as well as further objects and advantages of the invention will be more fully appreciated with reference to the following detailed description of a preferred, but nonetheless illustrative, embodiment when taken in conjunction with the following drawings wherein.

Figure 1:
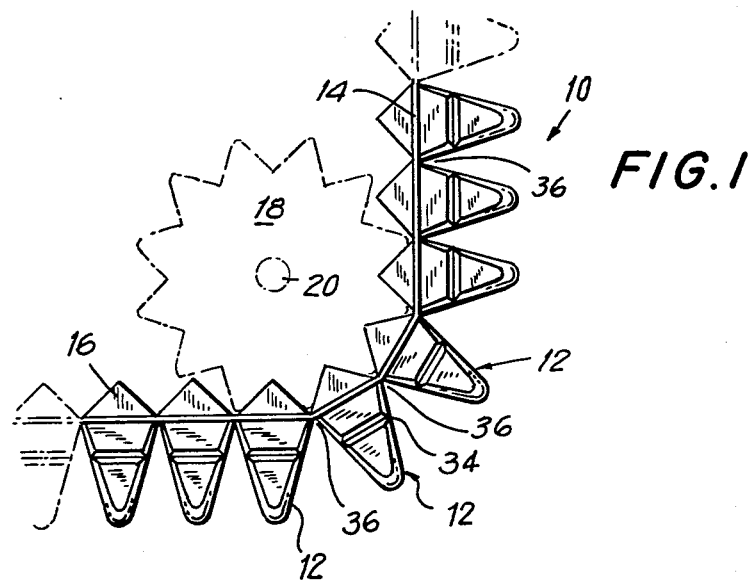
FIG. 1 is an elevation view of a section of the tread showing engagement of the tread gear teeth with a driving gear on the vehicle.

Referring initially to FIG. 1, tread assembly 10 consists of a plurality of individual tread elements 12 mounted seratim along a base element 14. Inward facing tread gear teeth 16 are dimensioned for engagement with vehicle drive gear 18 mounted for rotation upon axle 20.

Figure 3:
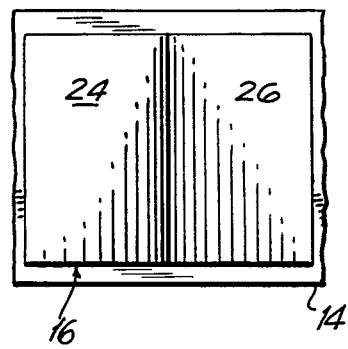
FIG. 3 is a bottom plan view of a tread section showing a tread gear tooth.
Figure 4:
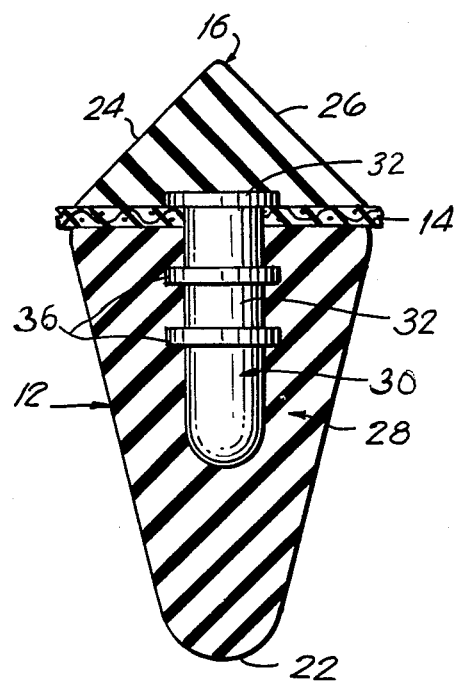
FIG. 4 is a side elevation view in section of a tread element and gear tooth.
Figure 5:
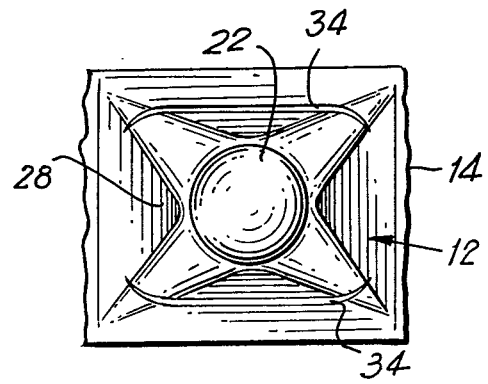
FIG. 5 is a top plan view of a tread element.

Referring next to the remaining figures, individual tread elements 12 are each in the form of a rectangular pyramid, the top 22 of which is truncated to provide a bearing surface for the weight of the vehicle when in contact with the ground. Both the top 22 as well as the edges of the tread elements are rounded. Projecting inwardly from the base element 14 and in plan alignment with the tread elements 12 are gear teeth 16 which, as may be best seen in FIGS. 3, 4 and 5 are in the form of triangular prisms having equal sides 24 and 26 directed perpendicular to the direction of drive. The gear teeth 16 are so dimensioned to mate with the teeth of drive gear 18.

Both the tread elements 12 and gear teeth elements 16 are mounted to flexible base 14, which permits the tread assembly to travel along the path required past drive gear 18 as well as other idler and or drive mechanisms as may be provided. Base element 14 may be of an appropriate gauge steel mesh, the exposed surfaces of which may be coated with an appropriate elastomeric compound such as a hard rubber. Both the tread elements 12 and gear teeth elements 16 are mounted to the base by means of internal fastener assembly 28, about which the elements are molded. Fastener assembly 28 includes a generally cylindrical post 30 projecting through base element 14, and retained in contact therewith by means of integral head 32 being welded or otherwise affixed to the base. Annular projections 36 extend outwardly from post 30, and provide the means by which tread elements 12 are retained upon the fastener. Head 32 may be provided with appropriate grooves or serrations (not shown) to similarly retain the gear teeth elements 16 to the base.

Figure 2:
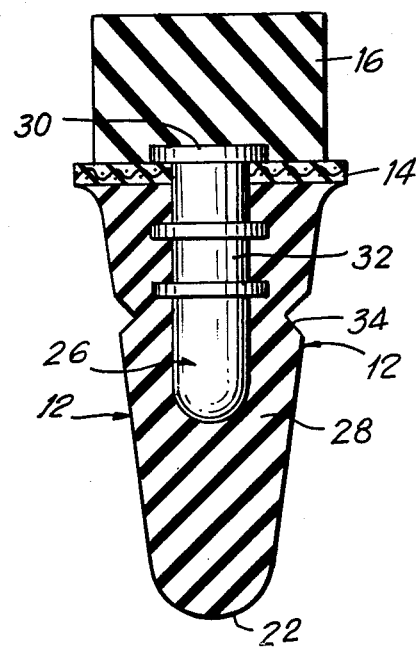
FIG. 2 is an elevation view in section of the tread showing construction of an individual tread element gear element detailing mounting to the flexible base element.

As may be seen from the FIGS. 2 and 5, tread elements 12 include a pair of parallel, opposed grooves 34 located parallel to the base along the sides of the elements. These grooves add to the flexibility of the individual tread elements and permit increased lateral flexion of the elements. This is of benefit when the treaded vehicle is negotiating uneven terrain, and assists in minimizing the turning radius of the vehicle. Grooves 34 may be advantageously applied to the individual tread elements as a part of the molding process.

The tread assembly of the present invention is formed into an endless loop of a length commensurate with the required path length as dictated by the vehicle dimensions. While base member 14 is flexible, rigidity of the individual tread element sections is assured by the molding process which molds the tread element 12 on one side of the base while the opposing gear teeth element 16 is in register with the tread element on the other side of the base. Thus, flexibility of the track assembly is provided only at the locations between the individual tread elements, as indicated by the numeral 36 in FIG. 1.

By means of the above an efficient propulsion system is produced, with the relatively small bearing surface of the individual tread elements providing for decreased resistance and permitting negotiation over surfaces and around curves which might otherwise be impossible to navigate by conventionally-driven vehicles. It is to be appreciated that numerous changes, modifications and variations of the invention as described herein may be apparent to one skilled in the art. Therefore, the true scope of the present invention is to be measured by the claims annexed hereto.

What is claimed is:

1. A tread for a tracked vehicle, comprising a continuous, flexible base member formed into a track loop having inside an outside surfaces; a plurality of tread elements projecting outwardly from said base member, each of said tread elements having the form of a truncated rectangular pyramid, each of said elements including means for improving the lateral flexibility thereof in the form of a pair of opposed lateral grooves on said tread elements; and a plurality of triangular gear teeth mounted upon the inside surface of said base member in registry with said tread elements.

2. The tread of claim 1 wherein said base member comprises an inner core of steel mesh covered with a rubber coating.

3. The tread of claim 1 wherein said tread elements have a rounded top and rounded edges.

4. The tread of claim 1 wherein said gear teeth are of rubber.

5. The tread of claim 1 wherein said tread elements are of rubber.

6. The tread of claim 1 wherein said tread elements are mounted to said base member by means of an internal fastener projecting outwardly from said base member about which said tread elements are molded, said fastener having a central post having two or more spaced annular projections.

7. A tread assembly for a tracked vehicle having one or more drive gears for engagement with the tread assembly, comprising a series of tread segments arranged seratim in the form of an outwardly facing closed loop, each of said tread segments being affixed to adjacent tread segments by means of a flexible base section; each of said tread segments being in the form of a truncated rectangular pyramid formed of a resilient material and including means for enhancing the tread's lateral flexibility, said means comprising a pair of opposed lateral grooves on said tread segments; and a series of gear teeth designed to mate with the drive gears of the vehicle, said gear teeth being mount seratim along said base section in alignment with said tread segments along said closed loop, said teeth facing inwardly of said, each of said teeth being in the form of a triangular prism, said tread segments and gear teeth being mounted to said base section by an internal fastener.

* * * * *